(12) United States Patent
Krol et al.

(10) Patent No.: US 11,718,027 B2
(45) Date of Patent: *Aug. 8, 2023

(54) DEVICE AND METHOD FOR PRODUCING THREE-DIMENSIONAL WORKPIECES

(71) Applicant: SLM Solutions Group AG, Lübeck (DE)

(72) Inventors: Toni Adam Krol, Lübeck (DE); Gesa Rolink, Lübeck (DE); Bodo Haack, Lübeck (DE); Birk Hoppe, Lübeck (DE)

(73) Assignee: SLM SOLUTIONS GROUP AG, Lübeck (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,822

(22) Filed: Jan. 14, 2022

(65) Prior Publication Data

US 2022/0134646 A1 May 5, 2022

Related U.S. Application Data

(63) Continuation of application No. 16/495,958, filed as application No. PCT/EP2018/055770 on Mar. 8, 2018, now Pat. No. 11,247,390.

(30) Foreign Application Priority Data

Mar. 24, 2017 (DE) ...................... 10 2017 205 027.6

(51) Int. Cl.
*B29C 64/232* (2017.01)
*B33Y 10/00* (2015.01)
(Continued)

(52) U.S. Cl.
CPC ............ *B29C 64/232* (2017.08); *B22F 10/28* (2021.01); *B22F 10/322* (2021.01);
(Continued)

(58) Field of Classification Search
None
See application file for complete search history.

(56) References Cited

U.S. PATENT DOCUMENTS 10,022,795 B1 * 7/2018 Redding ............ B23K 26/1437
2012/0225210 A1 * 9/2012 Fruth ...................... B33Y 30/00
427/331

(Continued)

OTHER PUBLICATIONS

European Patent Office, European Search Report, Patent Application No. EP 22193536, dated Dec. 13, 2022.
(Continued)

*Primary Examiner* — Yung-Sheng M Tsui
(74) *Attorney, Agent, or Firm* — Williams Mullen; Thomas F. Bergert

(57) ABSTRACT

The invention relates to a device (1) for producing three-dimensional workpieces (15), comprising a carrier (7) for receiving raw material powder (9), a build chamber wall (11, 11a, 11b) which extend substantially vertically and which is adapted to laterally delimit and support the raw material powder (9) applied to the carrier (7); an irradiation unit (17) for selectively irradiating the raw material powder (9) applied to the carrier (7) with electromagnetic radiation or particle radiation in order to produce on the carrier (7) a workpiece (15) manufactured from the raw material powder (9) by an additive layer building method, wherein the irradiation unit (17) comprises at least one optical element; and a vertical movement device (31) which is adapted to move the irradiation unit (17) vertically relative to the carrier (7). The build chamber wall (11, 11a, 11b) and the carrier (7) are adapted to be connected to one another in a stationary manner during the vertical movement of the irradiation unit (17) so that the vertical movement takes place relative to the carrier (7) and relative to the build chamber wall (11, 11a, 11b).

12 Claims, 3 Drawing Sheets

(51) Int. Cl.
    *B33Y 30/00*     (2015.01)
    *B33Y 40/00*     (2020.01)
    *B33Y 50/02*     (2015.01)
    *B29C 64/153*     (2017.01)
    *B29C 64/393*     (2017.01)
    *B29C 64/371*     (2017.01)
    *B28B 1/00*     (2006.01)
    *B28B 17/00*     (2006.01)
    *B22F 10/28*     (2021.01)
    *B22F 12/00*     (2021.01)
    *B22F 12/70*     (2021.01)
    *B22F 12/86*     (2021.01)
    *B22F 10/322*     (2021.01)
    *B22F 12/41*     (2021.01)
    *B22F 12/44*     (2021.01)
    *B22F 12/49*     (2021.01)
    *B22F 10/32*     (2021.01)

(52) U.S. Cl.
    CPC .......... *B22F 12/222* (2021.01); *B22F 12/224* (2021.01); *B22F 12/38* (2021.01); *B22F 12/70* (2021.01); *B22F 12/86* (2021.01); *B28B 1/001* (2013.01); *B28B 17/0081* (2013.01); *B29C 64/153* (2017.08); *B29C 64/371* (2017.08); *B29C 64/393* (2017.08); *B33Y 10/00* (2014.12); *B33Y 30/00* (2014.12); *B33Y 40/00* (2014.12); *B33Y 50/02* (2014.12); *B22F 10/32* (2021.01); *B22F 12/41* (2021.01); *B22F 12/44* (2021.01); *B22F 12/49* (2021.01)

(56) References Cited

U.S. PATENT DOCUMENTS

2016/0368050 A1*   12/2016   Morris ................ B22F 12/60
2017/0136538 A1*    5/2017   Yoshimura ............ B33Y 10/00
2017/0282245 A1*   10/2017   Yasuda ................ B22F 10/20

OTHER PUBLICATIONS

Search Report for German Application No. 10 2017 205 027.6, German Patent and Trademark Office, dated Feb. 23, 2022.

\* cited by examiner

DEVICE AND METHOD FOR PRODUCING THREE-DIMENSIONAL WORKPIECES

CROSS-REFERENCE TO RELATED APPLICATIONS

This application is a continuation of pending U.S. application Ser. No. 16/495,958 filed on Sep. 20, 2019, which is the U.S. national phase of international application PCT/EP2018/055770, filed on Mar. 8, 2018, which claims the benefit of German application DE 10 2017 205 027.6 filed on Mar. 24, 2017; all of which are hereby incorporated herein in their entirety by reference.

BACKGROUND AND SUMMARY

The invention relates to a device and a method for producing three-dimensional workpieces. In particular, the invention relates to a device and a method for producing three-dimensional workpieces by means of an additive layer building method.

In additive methods for the manufacture of three-dimensional workpieces, and in particular in additive layer building methods, it is known to apply an initially shapeless or shape-neutral molding compound (for example a raw material powder) to a carrier layer by layer and to solidify it by location-specific irradiation (e.g. by fusion or sintering) in order ultimately to obtain a workpiece of a desired shape. Irradiation can take place by means of electromagnetic radiation, for example in the form of laser radiation. In a starting state, the molding compound can initially be in the form of granules, powder or liquid molding compound and can be selectively or, in other words, location-specifically solidified as a result of the irradiation. The molding compound can comprise, for example, ceramics, metal or plastics materials and also material mixtures thereof. A variant of additive layer building methods relates to so-called powder bed fusion, in which in particular metallic and/or ceramics raw material powder materials are solidified to form three-dimensional workpieces.

In order to produce individual workpiece layers it is further known to apply raw material powder material in the form of a raw material powder layer to a carrier and to irradiate it selectively and in accordance with the geometry of the workpiece layer that is currently to be produced. The laser radiation penetrates the raw material powder material and solidifies it, for example as a result of heating, which causes fusion or sintering. Once a workpiece layer has solidified, a new layer of unprocessed raw material powder material is applied to the workpiece layer which has already been produced. Known coater arrangements or powder application devices can be used for this purpose. Irradiation is then again carried out on the raw material powder layer which is now uppermost and is as yet unprocessed. Consequently, the workpiece is gradually built up layer by layer, each layer defining a cross-sectional area and/or a contour of the workpiece. It is further known in this connection to use CAD or comparable workpiece data in order to manufacture the workpieces substantially automatically.

An irradiation unit, or an irradiation system, which can be used, for example, in a device for producing three-dimensional workpieces by irradiation of raw material powder materials is described in EP 2 333 848 B1. The irradiation system comprises a radiation source, in particular a laser source, and an optical unit. The optical unit, to which a processing beam emitted by the radiation source is provided, comprises a beam widening unit and a deflection device in the form of a scanner unit. Within the scanner unit, diffractive optical elements are provided in front of a deflection mirror, wherein the diffractive optical elements are movable into the beam path in order to split the processing beam into a plurality of processing sub-beams. The deflection mirror then serves to deflect the processing sub-beams.

It will be appreciated that all the aspects discussed above can likewise be provided within the scope of the present invention.

Known devices for producing three-dimensional workpieces are to be found, for example, in EP 2 961 549 A1 and in EP 2 878 402 A1.

The devices described in those documents each comprise a carrier, which can be lowered downwards layer by layer in the vertical direction. A corresponding vertical movement of the carrier takes place in these known devices whenever a layer of the raw material powder has been irradiated completely and before the next powder layer is applied. It can thus be ensured that a focal plane of the irradiation unit is always located in the layer of the raw material powder that is to be solidified (i.e. in the uppermost layer).

In the known devices described above, the vertical movability of the carrier requires actuating elements or a lifting mechanism. The lifting mechanism must carry and move inter alia both the workpiece to be built up and the surrounding powder material. Depending on the size of the installation and the size of a corresponding build space, the lifting mechanism used may thereby reach its load limits, which would require a more complex and thus more expensive lifting mechanism. Furthermore, the weight to be moved by the lifting mechanism changes during the build process. This can have the result that the adjustment travel cannot be kept constant between two adjustment operations of the lifting mechanism, which results in undesirable deviations in the layer thickness of the raw material powder layers. Accordingly, the object of the invention is to provide a solution for an additive layer building method which reduces or overcomes the above-mentioned problems and other associated problems, wherein the solution provides a simple and accurate possibility for controlling the layer thickness of a raw material powder layer, for example, even in the case of large build spaces.

The object is achieved by a device and method having the features of the claims.

Accordingly, the invention relates, according to a first aspect, to a device for producing three-dimensional workpieces. The device comprises a carrier for receiving raw material powder and a build chamber wall which extends substantially vertically and which is adapted to laterally delimit and support the raw material powder applied to the carrier. The device further comprises an irradiation unit for selectively irradiating the raw material powder applied to the carrier with electromagnetic radiation or particle radiation, in order to produce on the carrier a workpiece manufactured from the raw material powder by an additive layer building method, wherein the irradiation unit comprises at least one optical element. The device further comprises a vertical movement device which is adapted to move the irradiation unit vertically with respect to the carrier, wherein the build chamber wall and the carrier are adapted to be connected to one another in a stationary manner during the vertical movement of the irradiation unit, so that the vertical movement takes place relative to the carrier and relative to the build chamber wall.

The carrier can thereby provide a horizontal surface to which the raw material powder can be applied layer by layer, that is to say in horizontal layers. The build chamber wall can thereby serve to laterally delimit the build chamber. The build chamber can have, for example—defined by the build chamber wall—a round, elliptical, polygonal or rectangular, in particular a square, cross-section. The raw material powder can be so delimited and supported by the build chamber wall that it is held in shape by the build chamber wall so that it does not trickle downwards at the sides.

In the present disclosure, the term build chamber is to be understood as meaning a spatial region in which the application of the raw material powder layers takes place and which is delimited at the bottom by the carrier and at the sides by the build chamber wall. The build chamber can represent a volume which is closed in an air-tight manner and which is closed in an air-tight manner at the top by a suitable cover region and optionally by corresponding sealing means. The cover region can be vertically movable together with the irradiation unit. However, the build chamber can also be open at the top and thus not define a clearly defined volume. For example, the build chamber can have the form of a cube that is open at the top. The build chamber can be located inside an outer housing and/or inside an outer wall of the device. Furthermore, in addition to the build chamber, further build chambers can be located inside the outer housing as part of the device.

The build chambers described herein can be build chambers having a side length of, for example, in each case more than 50 cm. In other words, at least one of the two orthogonal side lengths of the carrier can be at least 50 cm. Furthermore, at least one of the two orthogonal side lengths of the carrier can be at least 100 cm. The carriers used herein can thus be, for example, carriers having a base area of 1 m×1 m.

The optical element of the irradiation unit can be, for example, a scan unit, a focusing unit and/or an F-theta lens. The irradiation unit can further comprise a radiation source, such as, for example, an electron beam source or a laser. However, the radiation emitted by the irradiation unit can also be supplied to the irradiation unit from a radiation source that is located outside the irradiation unit. Mirrors, optical fibers and/or other light guides, for example, can be used for this purpose.

The carrier can be connected in a stationary manner to a base of the device. The base of the device can comprise, for example, a baseplate of the device. The base can be adapted to be immovable after construction of the device and/or during operation of the device (i.e. during a build process). In particular, the base can be immovable with respect to a vertical direction. The term "immovable" here means immovability in relation to the surroundings in which the device is constructed.

The vertical movement device can comprise a lifting device, for example. The vertical movement device can comprise one or more hydraulic and/or mechanical actuators. During the vertical movement, the irradiation unit can move up and down independently of the build chamber wall. In particular, the build chamber wall can be so configured that it is not mechanically coupled with the irradiation unit and in particular does not move up and down together with the irradiation unit.

By means of this immovability of the build chamber wall it can be ensured that the raw material powder located therein is not mechanically influenced during the vertical movement and in particular that there is no undesired disturbance of the raw material powder in edge regions of the build chamber. It can thus be ensured that a surface of the raw material powder has the same (largely horizontal and flat) structure before and after the vertical movement of the irradiation unit. Furthermore, mechanical friction losses and thus energy losses at the build chamber wall/raw material powder interface can be avoided if the build chamber wall is not moved relative to the raw material powder during a build process.

The build chamber wall can be adapted to laterally surround the raw material powder applied to the carrier completely and to delimit and support the raw material powder on all sides.

"On all sides" here means that the build chamber wall represents a barrier for the raw material powder in all horizontal directions. However, at least one closable opening can be provided in the build chamber wall, through which opening raw material powder and/or the finished workpiece, for example, can be removed.

The build chamber wall can be rigidly connected to the carrier and/or to a base of the device. Alternatively, the build chamber wall can be detachably connected to the carrier and/or to the base and adapted to be detached from the carrier on completion of a build process, in order to remove the finished workpiece.

If the build chamber wall is detachably connected to the carrier, it can, for example, be capable of being lifted upwards in order, on completion of a build process, to free the finished workpiece and make it accessible from the sides. A corresponding lifting device for lifting the build chamber wall can be provided for this purpose.

The device can further comprise a powder application device which is adapted to apply the raw material powder layer by layer to the carrier.

The powder application device can comprise a powder container or and/or be connected to a powder reservoir so that raw material powder can be supplied to the powder application device. The powder application device can be adapted to move in the horizontal direction over a previous powder layer and thereby apply a new powder layer. To that end, the powder application device can comprise at least a roller, a pusher and/or similar suitable means for applying a raw material powder layer.

The vertical movement device can be adapted to move the irradiation unit vertically together with the powder application device.

The powder application device can thereby be fastened, for example, to a holding device which can be moved up and down together with the irradiation unit. The vertical distance between the irradiation unit and the powder application device can thus be kept constant. It can thereby be ensured that a new applied raw material powder layer is always located in a focal plane of the irradiation unit.

The device can comprise a further vertical movement device which is mechanically independent of the vertical movement device and which is adapted to move the powder application device vertically.

The further vertical movement device can be fastened, for example, to the build chamber wall. The further vertical movement device can comprise guide elements (for example rails) which are provided on an inner side of the build chamber wall and on which the powder application device can be moved up and down.

The device can further comprise a control unit which is adapted to control the vertical movement device in such a manner that the irradiation unit is vertically adjustable in terms of its height relative to the carrier and relative to the build chamber wall according to a desired thickness of a respective raw material powder layer that is to be applied.

The control unit can be a central control unit of the device, which monitors and/or controls a plurality of process sequences of the device. The control unit can comprise a processor (for example a CPU) and a memory. A program which comprises commands which cause the device to carry out the process sequence described herein can be stored in the memory. An adjustment travel of the vertical movement device, which is travelled in the context of a movement operation between the solidification of two layers, can correspond to the thickness of a raw material powder layer.

The device can further comprise at least one gas inlet, which is adapted to direct a gas into a build chamber defined by the build chamber wall, and at least one gas outlet, which is adapted to draw in the gas introduced from the gas inlet. The gas inlet and the gas outlet can in particular be adapted to generate a gas stream flowing substantially parallel to the carrier.

The gas can be an inert gas, such as, for example, argon or nitrogen. The gas inlet can comprise an opening which is adapted to allow the gas to flow substantially in a horizontal direction along a surface of the raw material powder layer. Furthermore, a gas outlet for drawing in the gas flowing out of the gas inlet can be provided. The gas outlet can be arranged, for example, substantially at the same height as the gas inlet. Furthermore, the gas outlet can be arranged opposite the gas inlet in the direction of a gas stream generated by the gas inlet. A substantially horizontal laminar gas stream along a surface of the raw material powder layer can thus be generated.

The vertical movement device can be adapted to move the irradiation unit vertically together with the gas inlet.

It can thus be ensured that the gas inlet is always at a constant height above the uppermost raw material powder layer. The gas inlet can thereby be mechanically rigidly coupled with the irradiation unit. If a gas outlet is additionally provided, the vertical movement device can further be adapted to move the irradiation unit vertically together with the gas inlet and the gas outlet. The device can comprise a plurality of irradiation units arranged side by side, each of which comprises at least one optical element and is adapted to scan an electromagnetic beam or a particle beam over the raw material powder, wherein the vertical movement device is adapted to move the plurality of irradiation units together vertically with respect to the carrier.

The irradiation units can be fastened to a common frame. Furthermore, an irradiation region within the build space can be defined for each of the irradiation units. The irradiation regions can be defined on a common carrier or on a plurality of carriers provided for the respective irradiation regions. The irradiation units can be adapted to scan, independently of one another, an electromagnetic beam or a particle beam over their respective irradiation region. Furthermore, each of the irradiation units can comprise a radiation source (for example a laser), but it is also possible to provide a common radiation source, the beam of which is split by at least one beam splitter into sub-beams for the respective irradiation units.

The device can further comprise a horizontal movement device, which is adapted to move the irradiation unit horizontally with respect to the carrier and with respect to the raw material powder applied to the carrier.

The horizontal movement device can be adapted to be moved horizontally in such a manner that regions of the build chamber which were not accessible to the irradiation unit before the horizontal movement are accessible to the irradiation unit after the horizontal movement and can be irradiated. In other words, the horizontal movement device can be adapted to be moved horizontally over the same carrier of the same build chamber. Furthermore, the horizontal movement device can be adapted to move the irradiation unit from a first build chamber to a second build chamber, as described hereinbelow.

The device can comprise a plurality of build chambers arranged side by side, each of which has a build chamber wall, which laterally surrounds the respective build chamber, and a carrier, wherein the horizontal movement device is adapted to move the irradiation unit from a first build chamber of the plurality of build chambers to a second build chamber of the plurality of build chambers.

The horizontal movement device can also be so configured that it moves the build chamber horizontally relative to the irradiation unit, wherein the irradiation unit remains stationary with respect to a horizontal direction. It is thus possible to provide, for example, a conveyor belt for build chambers, by means of which a plurality of build chambers can be supplied to the irradiation unit by a horizontal movement.

The horizontal movement can be carried out in such a manner that the irradiation unit is first located substantially centrally above the carrier of the first build chamber and, after the horizontal movement, is located substantially centrally above the carrier of the second build chamber. The horizontal movement device can have rollers or wheels by means of which it can be moved over a common base, wherein the rollers or wheels run over the common base. In addition or alternatively, rails or other suitable guide elements can be provided on the common base in order to guide the horizontal movement from the first build chamber to the second build chamber. The carrier of the first build chamber and the carrier of the second build chamber can be arranged on the common base. Furthermore, the carrier of the first build chamber and/or the carrier of the second build chamber can represent a portion of a surface of the common base.

This is the case in principle for all the carriers described herein: The carrier can represent a portion of a surface of a larger element, for example of a base. The carrier—apart from the build chamber wall—does not have to be distinguished structurally from a surface surrounding the carrier. For example, the carrier can be defined merely as an area of a base, wherein the build chamber wall delimits that area at the sides. The build chamber wall can, for example, be capable of being lifted upwards.

The horizontal movement device can also be so configured that the irradiation unit is fastened in a suspended manner to a common cover of the device and is guided along that common cover from the first build chamber to the second build chamber. Rails or other linear or non-linear guide elements, for example, can be provided for that purpose.

The device can further comprise a control unit which is adapted to control the horizontal movement device in such a manner that the irradiation unit, on completion of a first build process in the first build chamber, is moved horizontally to the second build chamber, and then to control the irradiation unit in such a manner that it begins a new build process in the second build chamber.

The finished workpiece can thus cool down in the first build chamber and/or already be unpacked (freed of excess raw material powder) while a build process is taking place in the second build chamber. The control unit can be the same control unit which also controls the vertical movement device. Alternatively, separate control units can also be provided. The control unit can further be a central control unit of the device. A common control unit of the vertical movement device and the horizontal movement device can be adapted, for example, on completion of the first build process, if required, to lift the irradiation unit vertically completely out of the build chamber, then to move it horizontally over the build chamber walls of the first and second build chamber, and to lower the irradiation unit in the second build chamber so that a first raw material powder layer can be applied in the second build chamber and selectively irradiated.

According to a second aspect, the invention relates to a method for producing three-dimensional workpieces. The method comprises applying raw material powder to a carrier, wherein the raw material powder applied to the carrier is laterally delimited and supported by a build chamber wall extending substantially vertically, and selectively irradiating the raw material powder applied to the carrier with electromagnetic radiation or particle radiation by an irradiation unit in order to produce on the carrier a workpiece manufactured from the raw material powder by an additive layer building method, wherein the irradiation unit comprises at least one optical element. The method further comprises moving the irradiation unit vertically with respect to the carrier by means of a vertical movement device, while the build chamber wall and the carrier are connected to one another in a stationary manner, so that the vertical movement takes place relative to the carrier and relative to the build chamber wall.

The method can be carried out, for example, by means of one of the devices described herein. Furthermore, the method can comprise all the method steps for which the devices described herein are suitable or adapted.

The method can further comprise moving the irradiation unit horizontally from a first build chamber to a second build chamber by means of a horizontal movement device, on completion of a build process in the first build chamber, and beginning a build process in the second build chamber.

BRIEF DESCRIPTION OF THE DRAWINGS

The invention will be explained hereinbelow with reference to the accompanying figures, in which.

DETAILED DESCRIPTION OF EMBODIMENTS

Figure 1:
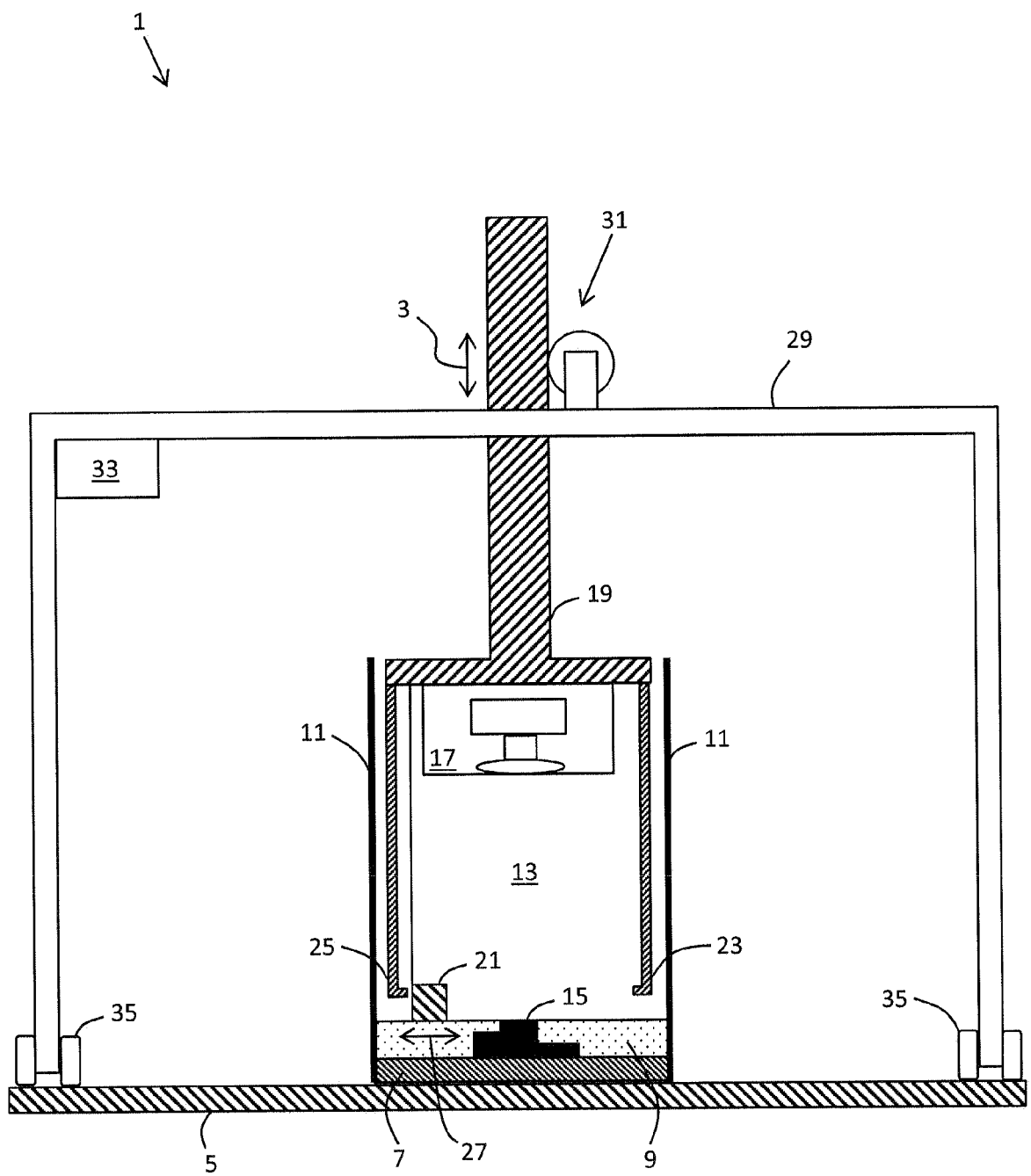
FIG. 1: is a schematic side view of a first exemplary embodiment of a device according to the invention which carries out a method according to the invention.

In FIG. 1, a first exemplary embodiment of a device 1 according to the invention is shown in a schematic side view. The views of the figures are not necessarily true to scale. A vertical direction (also z-direction hereinbelow) is defined in the figure by the arrow 3, and a horizontal plane (also x-y plane hereinbelow) extends perpendicular to the plane of the drawing along the base 5.

The base 5 represents a baseplate of the device 1. The device 1 can further have an outer housing (not shown) with outside walls and an outside cover. The device 1 can, however, also be provided without its own outer housing in an open construction, for example in a factory building.

On the base 5 there is provided a carrier 7 which has a horizontal rectangular surface. The carrier 7 is connected in a stationary manner to the base 5 and is adapted to receive a plurality of layers of raw material powder 9. Adjacent to the carrier 7 at the sides is a build chamber wall 11, which surrounds the carrier 7 completely at the sides. Both the carrier 7 and the build chamber wall 11 thus have a rectangular cross-section, when seen in a plan view. The build chamber wall 11 laterally surrounds the carrier 7 in such a manner that it is adjacent to the raw material powder 9 located on the carrier 7, supports it at the sides and holds it in a cuboid shape.

The build chamber wall 11 defines a build chamber 13 located within the build chamber wall 11. In the build chamber 13, a process of building a workpiece 15 by means of an additive layer building method takes place. The build chamber 13 is delimited at the sides by the build chamber wall 11 and at the bottom by the carrier 7. A physical delimitation of the build chamber 13 at the top is not necessary, in particular the build chamber 13 does not have to be closed at the top in an air-tight manner. In the representation of FIG. 1, the build chamber 13 is delimited at the top by an irradiation unit 17 and by a portion of an irradiation unit carrier 19.

The build chamber 13 can, however, be closed in an air-tight manner, for example by providing sealing means (not shown) between the build chamber wall 11 and the irradiation unit carrier 19. This has the advantage that a protecting gas (for example an inert gas such as argon or nitrogen) cannot flow out of the build chamber 13, and that impurities cannot enter the build chamber 13. However, air-tight sealing is not absolutely necessary, for example, in the case of the use of argon as protecting gas, since argon, because of its high density, accumulates in the region of the build chamber bottom (that is to say in the region of the raw material powder 9) and cannot escape upwards.

The device 1 further has a powder application device 21, by means of which the raw material powder 9 can be applied layer by layer to the carrier 7. To that end, the powder application device 21 can comprise at least one roller, at least one pusher and/or other suitable powder application means, which are suitable for applying to the carrier 7, or to a previous raw material layer, a raw material powder layer that is as uniformly thick as possible. The powder application device 21 is connected to a raw material powder reservoir (not shown), in order to be supplied with raw material powder from the reservoir.

The device 1 further has an irradiation unit 17 for selectively irradiating the raw material powder 9 applied layer by layer to the carrier 7. By means of the irradiation unit 17, the raw material powder 9 can be exposed to location-specific radiation, in dependence on the desired geometry of the workpiece 15 to be produced. To that end, the irradiation unit 17 has a radiation source, which can be provided in the form of a laser. The laser can, for example, emit light at a wavelength of approximately 1064 nm. Alternatively, the radiation source (for example a laser) can also be located outside the irradiation unit 17 and a beam to be directed onto the raw material powder 9 is fed to the irradiation unit 17, for example, by means of an optical fiber.

The irradiation unit 17 further has optical elements, such as, for example, a scan unit, a focusing unit and an F-theta lens. The scan unit is adapted to scan the beam over the uppermost raw material powder layer within a horizontal plane (in the x-direction and y-direction). The focusing unit is adapted to change or adapt a focus position of the beam (in the z-direction), so that a focal plane of the irradiation unit 17 is located in the region of the uppermost raw material powder layer, which is irradiated by the irradiation unit 17. The irradiation unit 17 can be, for example, an irradiation unit or irradiation device as described in EP 2 333 848 B1.

The device 1 further has a gas inlet 23 and a gas outlet 25. The gas inlet 23 has an opening for the outflow of a gas (for example an inert gas such as argon or nitrogen). The gas outlet 25 further has an opening for drawing in the gas flowing out of the gas inlet 23. The opening of the gas inlet 23 and the opening of the gas outlet 25 are arranged substantially at the same height and at a small distance from a surface of the raw material powder 9. In this manner, a laminar and substantially horizontal gas stream can be provided parallel to the carrier 7 over the surface of the raw material powder 9. This gas stream can be suitable to be able to draw off in a controlled manner process-related impurities (for example splashes and melt deposits). The gas inlet 23 and the gas outlet 25 can be configured, for example, as described in European patent application 15 186 889.0.

Both the gas inlet 23 and the gas outlet 25 are optional elements of the device 1, wherein those elements can be omitted or provided at a different location than that described herein.

The irradiation unit 17, the gas inlet 23 and the gas outlet 25 are fastened to the irradiation unit carrier 19 in such a manner that a vertical movement of the irradiation unit carrier 19 leads to a vertical movement of the irradiation unit 17, the gas inlet 23 and the gas outlet 25. Furthermore, the powder application device 21 is fastened to the irradiation unit carrier 19 in such a manner that a vertical movement of the irradiation unit carrier 19 leads to a vertical movement of the powder application device 21. Alternatively, however, the powder application device 21 can also be arranged independently of the irradiation unit carrier 19. The powder application device 21 can, for example, be arranged on the build chamber wall 11 and be provided with a corresponding vertical movement device in order to be moved up and down along the build chamber wall 11. Furthermore, a horizontal movement device is provided for the powder application device 21, by means of which horizontal movement device the powder application device 21 can be moved over the carrier 7 in the horizontal direction, as is indicated by the arrow 27. Alternatively or in addition to the movement in the direction of the arrow 27 (x-direction), the horizontal movement device of the powder application device 21 can also be adapted to move the powder application device 21 in the y-direction over the carrier 7.

The irradiation unit carrier 19 is fastened to a frame 29 in such a manner that it is movable vertically. The irradiation unit carrier 19 and thus the irradiation unit 17 can be moved up and down with respect to the frame 29 by means of a vertical movement device 31. The vertical movement device 31 of the device 1 shown in FIG. 1 comprises a motor, which can be, for example, a step motor or servomotor. The vertical movement device 31 can be configured in many different ways and can comprise, for example, any type of actuating elements or lifting device. For example, the vertical movement device 31 can have a hydraulic and/or mechanical actuator. The vertical movement device 31 can have, for example, a spindle shaft and a motor that drives the spindle shaft.

By means of the vertical movement device 31, a vertical distance between the irradiation unit 17 and the carrier 7 can be changed. In particular, that distance can be so changed that a distance between the irradiation unit 17 and the uppermost layer of the raw material powder 9 always remains constant. The vertical movement of the vertical movement device 31 takes place independently of and relative to the build chamber wall 11, that is to say in particular that the build chamber wall 11 is not moved by the vertical movement device 31.

The device 1 further comprises a control unit 33 which is adapted to control the vertical movement device 31 and a horizontal movement device 35 described hereinbelow. The control unit 33 comprises a CPU and a memory, wherein a program is stored in the memory, which program, when executed by the CPU, causes the device 1 to carry out one of the methods described herein. The control unit 33 can further take over all the control tasks of the device 1 and, for example, control the irradiation unit 17, the powder application device 21, the gas stream through the gas inlet 23 and the gas outlet 25.

A build process of the device 1 takes place in such a manner and is controlled by the control unit 33 in such a manner that the vertical movement device 31 moves the powder application device 21 downwards to such an extent that the powder application device 21 can apply a first raw material powder layer to the carrier 7. Then or at the same time, the vertical movement device 31—if necessary—moves the irradiation unit 17 to a height which is suitable for selectively irradiating that first raw material powder layer and solidifying it (for example by fusion or sintering). The scan unit thereby scans the beam over the raw material powder 9 in accordance with a predetermined pattern. Once the first raw material powder layer has been irradiated as desired, the vertical movement device 31 moves the powder application device 21 to a height at which it can apply a second raw material powder layer to the first raw material powder layer. An operation of irradiating the second raw material powder layer then takes place, analogously to the irradiation of the first raw material powder layer.

During the building of the desired workpiece 15, the vertical movement device 31 thus moves the irradiation unit 17 (and where applicable the further components fastened to the irradiation unit carrier 19, namely the gas inlet 23, the gas outlet 25 and/or the powder application device 21) increasingly further away from the carrier 7. The irradiation unit 17 can then be lifted upwards out of the build chamber 13 completely and moved by means of a horizontal movement device 35 to a further build chamber, as will be described hereinbelow with reference to FIG. 3.

Once the build process in the build chamber 13 is complete, the finished workpiece 15 can cool down, and then a lifting device (not shown) can lift the build chamber wall 11 upwards so that excess raw material powder 9 is able to trickle out of the build chamber 13 at the sides and the finished workpiece 15 is accessible from the sides. The workpiece 15 can then be freed from the excess raw material powder 9 completely. Furthermore, a closable opening can be provided in the build chamber wall 11, which opening can be opened after the build process and through which the finished workpiece 15 and/or excess raw material powder 9 can be removed.

The frame 29 of the device 1 further has a horizontal movement device 35. In the exemplary embodiment of FIG. 1, the horizontal movement device 35 comprises rollers by means of which the frame 29 together with the irradiation unit carrier 19 fastened thereto and the components (irradiation unit 17, gas inlet 23, gas outlet 25 and/or powder application device 21) fastened to the irradiation unit carrier 19 can be moved horizontally. The rollers are driven by one or more motors, wherein the motors are controlled by the control unit 33. The frame 29 is thereby rolled over the base 5 by means of the rollers. In addition, it is possible to provide corresponding (linear or non-linear) guide elements such as, for example, rails, which guide the horizontal movement of the frame 29 over the base 5. Alternatively to the form of FIG. 1, in which the frame 29 is rolled over the base 5 via rollers, the frame 29 can be fixed in a horizontally movable manner to a cover of an outer housing of the device 1, which can be ensured, for example, by corresponding rails.

The horizontal movement device 35 can be so configured that it permits not only a linear movement in a horizontal direction but also controlled movements within the horizontal plane (both in the x-direction and in the y-direction).

The horizontal movement device 35 can on the one hand serve to make regions of the raw material powder layers which were not accessible to the irradiation unit 17 before the horizontal movement accessible to the irradiation unit 17 during the process of building the workpiece 15. An effective build area can thus be enlarged, and larger workpieces 15 can be produced. On the other hand, the horizontal movement device 35 can serve to move the irradiation unit 17 from a first build chamber to a second build chamber, as will be described below with reference to FIG. 3.

Figure 2:
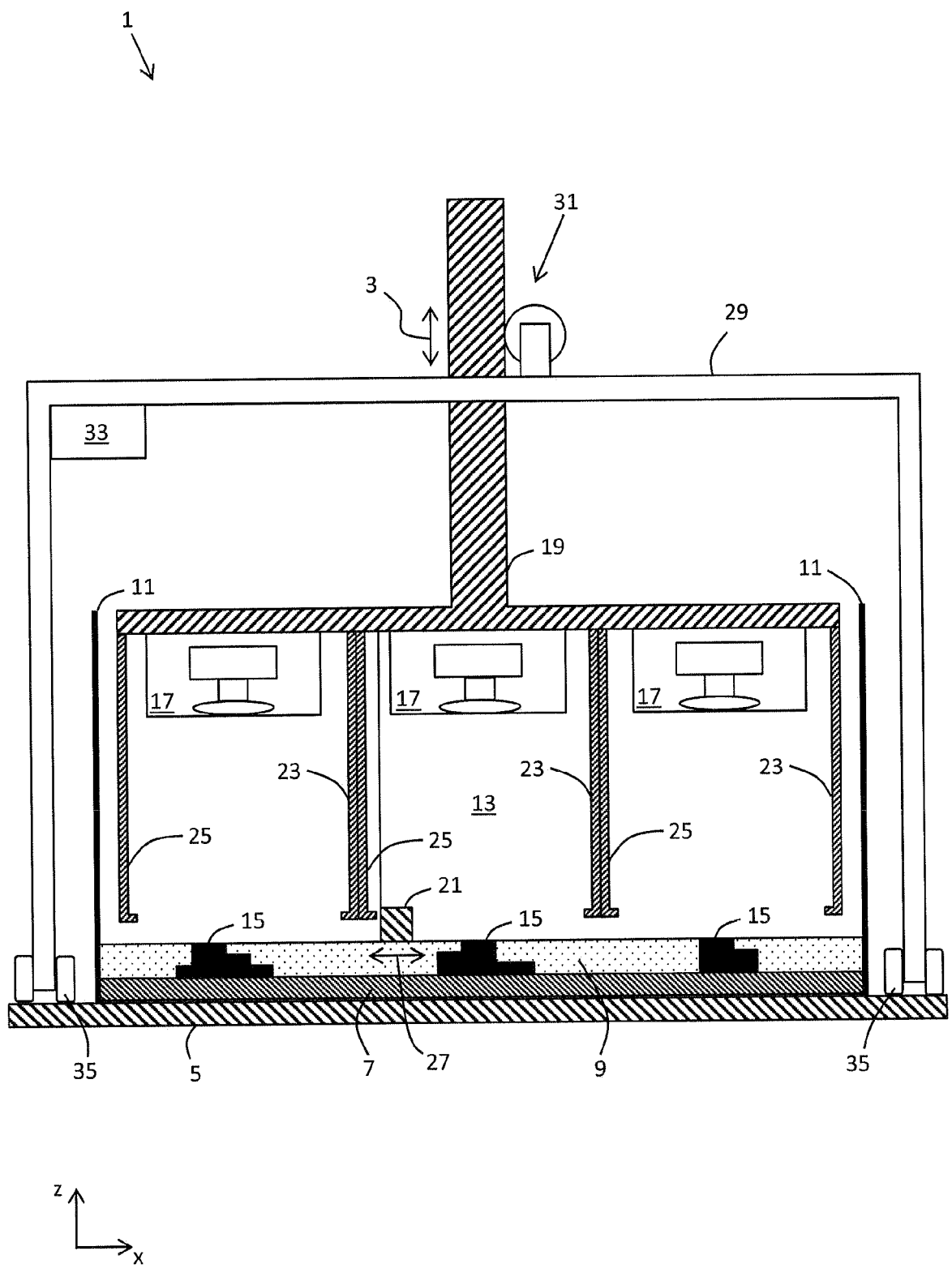
FIG. 2: is a schematic side view of a second exemplary embodiment of a device according to the invention which carries out a method according to the invention.

In FIG. 2, a second exemplary embodiment of a device 1 according to the invention is shown in a schematic side view. Elements having the same reference numeral correspond to those of the device 1 of FIG. 1. The mode of operation of those elements is identical to the mode of operation of the corresponding elements of the device 1 of FIG. 1.

In a departure from the device 1 of FIG. 1, the device 1 of FIG. 2 has not only one but a plurality of irradiation units 17 arranged side by side. In the example of FIG. 2, three irradiation units 17 are provided, wherein it is also possible to provide fewer or more irradiation units 17. Each of the irradiation units 17 defines an irradiation region on a common carrier 7. In each of the irradiation regions, a workpiece 15 can be produced. It is, however, also possible that the irradiation regions of the irradiation units 17 are directly adjacent to one another or overlap, so that a large workpiece can be produced, wherein each of the irradiation units 17 is responsible for solidifying a predetermined region of the workpiece. The three irradiation regions are located in a common build chamber 13, which is surrounded by a build chamber wall 11.

For each of the irradiation units 17 there are provided a gas inlet 23 and a gas outlet 25 for generating a horizontal gas stream over the respective irradiation region. Alternatively, however, it is also possible to provide only a common gas inlet and a common gas outlet 25, so that, for example, a gas inlet 23 and a gas outlet 25 are provided only in the outer regions of the irradiation unit carrier 19. The device 1 further has a common powder application device 21 which is able to apply powder layers over the entire area of the carrier 7. Alternatively, each of the irradiation regions can be provided with its own powder application device.

Because the device 1 of FIG. 2 has a plurality of irradiation units 17, it is possible on the one hand to produce larger (common) workpieces, and on the other hand it is possible to produce a plurality of workpieces 15 simultaneously, which leads to a reduced process time per workpiece 15.

Figure 3:
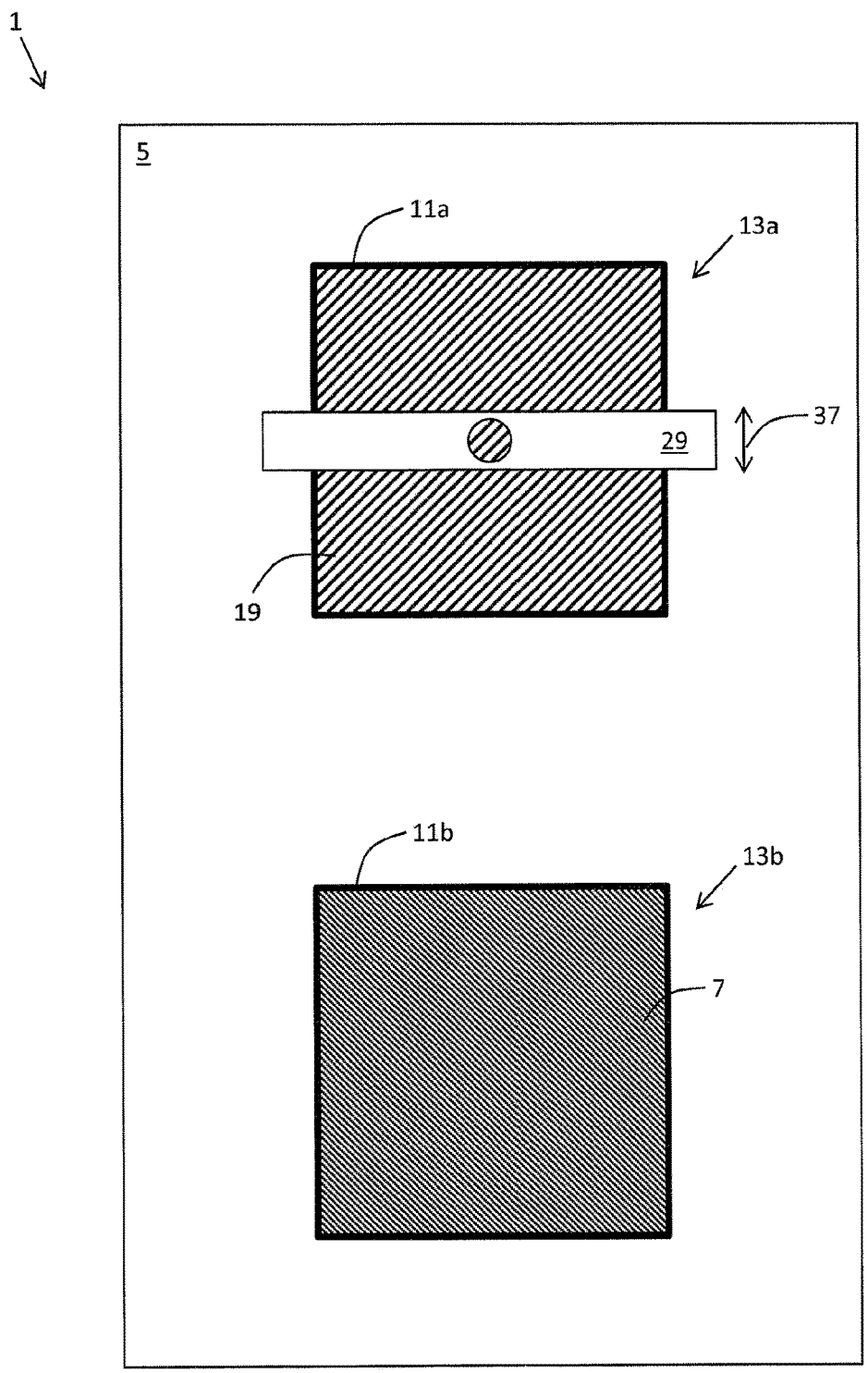
FIG. 3: is a schematic plan view of a third exemplary embodiment of a device according to the invention which carries out a method according to the invention.

FIG. 3 shows a third exemplary embodiment of a device 1 for producing a three-dimensional workpiece, wherein the device 1 of the third exemplary embodiment can comprise, for example, the device 1 of FIG. 1 or the device 1 of FIG. 2. The device 1 of FIG. 3 comprises a first build chamber 13a and a second build chamber 13b. Further build chambers (not shown) can also be provided.

In FIG. 3, the first build chamber 13a and the second build chamber 13b are shown in a plan view. The build chamber 13a is surrounded by a build chamber wall 11a, and the build chamber 13b is surrounded by a build chamber wall 11b. The build chamber 13a or 13b can be, for example, one of the build chambers 13 shown in FIG. 1 or FIG. 2. The build chambers 13a and 13b are arranged on a common base 5.

Furthermore, in the state shown in FIG. 3, the frame 29 is located above the first build chamber 13a, so that a workpiece 15 can be produced inside the build chamber 13a by an additive layer building method. The elements of the device 1 that are necessary therefor correspond, for example, to those of FIG. 1 or FIG. 2.

On completion of the build process in the first build chamber 13a, the frame 29 moves by means of the horizontal movement device 35 over the base 5 from the first build chamber 13a to the second build chamber 13b, as shown by the arrow 37. Over the second build chamber 13b, the irradiation unit 17, or the irradiation units 17, is/are then lowered by means of the vertical movement device 31 over the carrier 7, and a new (second) build process is begun in the second build chamber 13b.

During the second build process, the workpiece 15 in the first build chamber 13a can cool down and already be removed, for example, by lifting the build chamber wall 11a or through an opening in the build chamber wall 11a.

This allows a plurality of workpieces 15 to be produced in a plurality of build chambers 13a, 13b by means of a reduced number of irradiation units 17, compared with a situation in which each of the build chambers 13a, 13b has its own irradiation unit 17 or own irradiation units 17. In addition to the two build chambers 13a and 13b shown in FIG. 3, further build chambers with corresponding build chamber walls can be provided, so that the frame 29 together with its irradiation unit(s) 17 (and where appropriate the further components fastened to the irradiation unit carrier 19, namely gas inlet/inlets 23, gas outlet/outlets 25 and/or powder application device(s) 21) can move to those build chambers in succession and in each case can carry out a build process in the respective build chamber.

The build chambers 13, 13a, 13b described herein can be large build chambers with a side length of, for example, in each case more than 50 cm. In other words, at least one of the two orthogonal side lengths of the carrier 7 can be at least 50 cm. Furthermore, at least one of the two orthogonal side lengths of the carrier 7 can be at least 100 cm. The carriers 7 used herein can thus be carriers having a base area of 1 m×1 m.

Because the device described herein has a vertically movable irradiation unit, a relative movement of the irradiation unit relative to the carrier takes place without the carrier having to be moved. When correspondingly large carriers are used, this has the advantage that it is not necessary to move a heavy amount of powder and a heavy workpiece during the build process.

Furthermore, the irradiation unit is moved relative to the build chamber wall, so that the build chamber wall remains stationary with respect to the raw material powder and no friction takes place at an interface between the build chamber wall and the raw material powder, and thus the powder layers are not disturbed. Because the build chamber wall remains stationary with respect to the raw material powder, it is relatively unproblematic to seal the build chamber wall relative to the carrier, that is to say to ensure that no powder can pass through a gap between the build chamber wall and the carrier. In conventional devices, such sealing represents a greater problem because the carrier must be able to move vertically relative to the build chamber wall.

Movability of the irradiation unit independently of the build chamber wall further permits movability of the irradiation unit from a first build chamber to a second build chamber and, from there, optionally to further build chambers.

The invention claimed is:

1. A device for producing three-dimensional workpieces, comprising:
   a carrier for receiving raw material powder,
   a build chamber wall which extends substantially vertically and which is adapted to laterally delimit and support the raw material powder applied to the carrier,
   an irradiation unit for selectively irradiating the raw material powder applied to the carrier with electromagnetic radiation or particle radiation in order to produce on the carrier a workpiece manufactured from the raw material powder by an additive layer building method, wherein the irradiation unit comprises at least one optical element,
   a vertical movement device which is adapted to move the irradiation unit vertically with respect to the carrier, wherein the build chamber wall and the carrier are adapted to be connected to one another in a stationary manner during the vertical movement of the irradiation unit so that the vertical movement takes place relative to the carrier and relative to the build chamber wall,
   a horizontal movement device which is adapted to move the irradiation unit horizontally with respect to the carrier and with respect to the raw material powder applied to the carrier, and
   a plurality of build chambers arranged side by side, each of which has a build chamber wall which laterally surrounds the respective build chamber, and a carrier, wherein the horizontal movement device is adapted to move the irradiation unit from a first build chamber of the plurality of build chambers to a second build chamber of the plurality of build chambers.

2. The device as claimed in claim 1, wherein the build chamber wall is adapted to laterally surround the raw material powder applied to the carrier completely and to delimit and support the raw material powder on all sides.

3. The device as claimed in claim 1, wherein the build chamber wall is rigidly connected to the carrier and/or to a base of the device, or wherein the build chamber wall is detachably connected to the carrier and/or to the base and is adapted to be detached from the carrier on completion of a build process, in order to remove the finished workpiece.

4. The device as claimed in claim 1, further comprising a powder application device which is adapted to apply the raw material powder layer by layer to the carrier.

5. The device as claimed in claim 4, wherein the vertical movement device is adapted to move the irradiation unit vertically together with the powder application device.

6. The device as claimed in claim 4, further comprising a further vertical movement device which is mechanically independent of the vertical movement device and which is adapted to move the powder application device vertically.

7. The device as claimed in claim 1, further comprising a control unit which is adapted to control the vertical movement device in such a manner that the irradiation unit is vertically adjustable in terms of its height relative to the carrier and relative to the build chamber wall according to a desired thickness of a respective raw material powder layer that is to be applied.

8. The device as claimed in claim 1, further comprising at least one gas inlet which is adapted to direct a gas into a build chamber defined by the build chamber wall, and at least one gas outlet which is adapted to draw in the gas introduced from the gas inlet, wherein the gas inlet and the gas outlet are in particular adapted to generate a gas stream flowing substantially parallel to the carrier.

9. The device as claimed in claim 8, wherein the vertical movement device is adapted to move the irradiation unit vertically together with the gas inlet and the gas outlet.

10. The device as claimed in claim 1, wherein the device comprises a plurality of irradiation units arranged side by side, each of which comprises at least one optical element and each of which is adapted to scan an electromagnetic beam or a particle beam over the raw material powder, and wherein the vertical movement device is adapted to move the plurality of irradiation units together vertically with respect to the carrier.

11. The device as claimed in claim 1, further complising a control unit which is adapted to control the horizontal movement device in such a manner that the irradiation unit, on completion of a first build process in the first build chamber, is moved horizontally to the second build chamber, and then to control the irradiation unit in such a manner that it begins a new build process in the second build chamber.

12. A method for producing three-dimensional workpieces, comprising:
   applying raw material powder to a carrier, wherein the raw material powder applied to the carrier is laterally delimited and supported by a build chamber wall extending substantially vertically,
   selectively irradiating the raw material powder applied to the carrier with electromagnetic radiation or particle radiation by an irradiation unit in order to produce on the carrier a workpiece manufactured from the raw material powder by an additive layer building method, wherein the irradiation unit comprises at least one optical element,
   moving the irradiation unit vertically with respect to the carrier by means of a vertical movement device, while the build chamber wall and the carrier are connected to one another in a stationary manner, so that the vertical movement takes place relative to the carrier and relative to the build chamber wall,
   moving the irradiation unit horizontally from a first build chamber to a second build chamber by means of a horizontal movement device, on completion of a build process in the first build chamber, and
   beginning a build process in the second build chamber.

* * * * *